United States Patent [19]

Ohno

[11] 4,271,114
[45] Jun. 2, 1981

[54] METHOD OF COMPACTING DRY POWDER INTO SHAPES

[75] Inventor: John M. Ohno, Plymouth, Mich.

[73] Assignee: General Electric Company, Detroit, Mich.

[21] Appl. No.: 131,113

[22] Filed: Mar. 17, 1980

Related U.S. Application Data

[63] Continuation-in-part of Ser. No. 815,873, Jul. 14, 1977, which is a continuation of Ser. No. 713,569, Aug. 11, 1976, abandoned, which is a continuation of Ser. No. 337,581, Mar. 2, 1973, abandoned.

[51] Int. Cl.³ .............................................. B22F 3/06
[52] U.S. Cl. .................................. 264/114; 264/111; 264/125; 264/313
[58] Field of Search .................... 264/114, 125, 313

[56] References Cited

U.S. PATENT DOCUMENTS

| | | | |
|---|---|---|---|
| 2,304,723 | 12/1942 | Wolff et al. | 264/114 |
| 2,435,227 | 2/1948 | Lester | 264/114 |
| 3,502,755 | 3/1970 | Murray | 264/313 |

*Primary Examiner*—Donald E. Czaja
*Assistant Examiner*—James R. Hall
*Attorney, Agent, or Firm*—Morgan, Finnegan, Pine, Foley and Lee

[57] ABSTRACT

A method of making shaped articles from powders comprises forming a cup mold of a destructible organic polymeric material such as nylon, cellulose acetate, poly(methyl methacrylate), polypropylene or polyethylene. The inner surface of the mold corresponds in configuration with the outer surface configuration desired in the shaped article. This mold is placed in a support member and filled with a measured quantity of powder. A plunger composed of a metal having a high specific gravity is placed on top of the powder, and the mold, mold support, powder and plunger combination is positioned in the swing bucket of a centrifugal apparatus where it is subjected to centrifugal force sufficient to achieve the desired degree of compaction of the powder. The mold is then removed and subjected to treatment at a temperature which is sufficient in the first instance to destroy the polymeric mold material, and then sufficient to sinter the powder. If desired, the surface of the plunger making contact with the powder may be shaped so as to provide a pattern on the powder surface, or to impart a chamfered surface to the powder.

7 Claims, 9 Drawing Figures

METHOD OF COMPACTING DRY POWDER INTO SHAPES

This application is a continuation-in-part of application Ser. No. 815,873, filed July 14, 1977, which, in turn, is a continuation of application Ser. No. 713,569, filed Aug. 11, 1976, now abandoned, which, in turn, is a continuation of application Ser. No. 337,581, filed Mar. 2, 1973, now abandoned.

BACKGROUND OF THE INVENTION

In forming small parts of metal powder it has been customary to mix the powder with a small quantity of binder material and compact it in a mold with sufficient pressure to enable the compacted material to hold its shape after withdrawal from the mold. The shaped material is then sintered in an oven to drive off the binder material and to impact cohesiveness to the shaped mass. This method of forming is applied not only to powders composed entirely of metal particles but also to powders which are formed into refractory shapes referred to as cermets, such as cemented tungsten carbides.

While compaction of the powders is usually achieved in a press having reciprocating movement, it may be better achieved in the sense of enhancing uniformity by the application of centrifugal force as illustrated in Wolff et al. U.S. Pat. No. 2,304,723 or a combination of vibration and centrifugal force as is shown in Lester, U.S. Pat. No. 2,435,227. The Wolff technique overcomes a prior art disadvantage in that it uses a carbon, graphite or metal mold to avoid breakage of the article. Sintering a plug in such a mold causes the article to shrink, whereupon it slips easily out of the mold. It is suggested also to use low-melting lead as a mold, because it will melt away from the sintered article. Lester, on the other hand, compresses the loose powder into a heat resistant mold comprising graphite, aluminum oxide or metal. One obtains a uniform preform by this technique but removal from the mold can cause breakage, as noted by Wolff. Murray, U.S. Pat. No. 3,502,755 describes making fired or sintered articles, having indentations, from metal powders or ceramics. In this technique, the powder is placed in a rubber bag mold and the mold is squeezed by pressure applied to the outside of the bag. To produce an indented shape, Murray provides a cup-shaped, thin rubber dam within the powder body and, after releasing the pressure, the dam is removed, pulling out a plug of waste material corresponding to the shape of the desired indentation (and the dam). Murray suggests that one way of removing the dam is to burn it out during the firing operation. However, the use of a bag molding technique cannot provide the accurate dimensions required by the designer because, as Murray observes, only relatively simple shapes such as rods and cylinders can be produced, or tubes, if a mandrel is inserted in the powder mixture and removed later.

The present invention is directed toward a process for making shaped articles with close tolerances using centrifugal compaction into a destructible thin walled polymeric mold which is preferably non-compressible, and which process does not use a conventional graphite or metal mold except as a support. Whereas the molds described in the prior art teachings of Lester and Wolff react with carbide powders during sintering, in the present invention, the thin walled polymeric mold is not compressible in a metal support and holds the accurate dimensions required by the designers. In addition, the polymeric mold, unlike the prior art rubber bag mold, has good lubricity. It is therefore, easily removed from a metal support mold. On the other hand, the prior art rubber mold cannot be readily removed from a metal support without possibly rupturing or breaking the compressed shaped compact within the mold.

Another advantage of the process of the present invention is that the polymeric mold is disposable during sintering without harmful effect. The polymeric mold is removed completely and cleanly in the furnace, similar to the elimination of paraffin in a powder mix.

In addition, centrifugal compaction into a disposable, destructible mold in accordance with this invention provides the designer with greater freedom in designing parts. For example, a tungsten carbide part for which there is considerable demand consists of a cylinder terminating at one end in a generally cone-shaped portion. This part can be made by press compaction only if the ratio of the cone height to the total height is less than 51%, and the cone angle is greater than 19°. Obviously, it cannot be made by Murray's bag molding technique. These limitations are not present if the present invention is used.

SUMMARY OF THE INVENTION

According to the present invention there is provided a method of making shaped articles from sinterable powder which comprises:

(a) introducing said powder into a cup mold composed of destructible organic polymeric material selected from the group consisting of nylon, cellulose acetate, poly(methyl methacrylate), polypropylene or polyethylene, with an inner surface configuration corresponding to the outer surface configuration desired in the shaped article, said cup mold being supported by a metal mold support, (b) positioning a metal plunger, having a shank contoured to have a snug fit in said cup mold, so as to make contact with the powder, (c) subjecting the powder, the cup mold, the mold support, and the plunger to centrifugal force to compress the powder against the inner wall of said cup mold, (d) removing said polymeric mold with shaped compressed powder from said metal mold support, (e) heating said mold and compressed powder to vaporize said mold, and (f) further heating to sinter said shaped compressed powder.

It is a preferred feature of the present invention to produce cemented metal carbide parts. In this embodiment a cup mold of polymeric plastic material is filled with a measured quantity of a powder such as tungsten carbide or titanium carbide in which has been incorporated a powder of binder material such as cobalt or nickel. A plunger of heavy metal having a snug fit with the orifice of the cup mold is inserted in the mold which is then placed in a supported position within the swing bucket of a centrifugal machine. The machine is then operated to apply centrifugal force against the powder particles with the help of the heavy metal plunger. This imparts a uniform compaction to the powder particles. If desired, the portion of the plunger which engages the powder particles may have a configuration to impart a chamfer or pattern to the powder. After compaction the mold is removed from the swing bucket, the plunger removed from the mold, and the mold with the compacted particles is subjected to the application of heat. Heat is applied in stages, the first stage to destroy the mold by vaporizing and the second stage, at a higher temperature, to effect the sintering of the particles into a cohesive mass.

DESCRIPTION OF THE PREFERRED EMBODIMENT

Figure 1A:
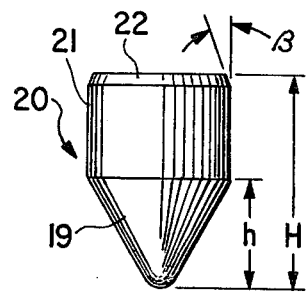
FIG. 1A is a side elevational view of a long-nose chisel compact to be made according to the process of the subject invention.
Figure 1B:
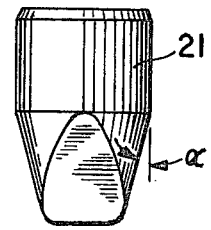
FIG. 1B is a front elevational view of the long-nose chisel compact as illustrated in FIG. 1A.

Referring to FIGS. 1A and 1B, the process of the subject invention is intended for use in manufacturing hard-to-press shapes of sintered materials, such as a so-called long-nose chisel compact which may be used as the drill bit in mining operations in order to increase drilling efficiency, which compact is generally designated by the numeral 20. The shape of chisel compact 20 is characterized by an arrangement wherein the height "h" of the nose portion 19 is larger than 51% of the total height "H" of the long-nose chisel compact 20. As indicated above, this design is to increase the drilling efficiency in mining operations. For further efficiency, the side angle "α" (see FIG. 1B) corresponding to the angular relationship between the sides of the nose portion 19 and the body portion 21 is smaller than 19°, whereas the chamfer angle "β" (see FIG. 1A) between the chamfered top 22 and the body 21 of the compact 20 is approximately 15°. Preferably, and in order to insure the structural integrity of the long-nose chisel compact 20, the density of the sintered particles forming the compact is uniform throughout the nose portion 19, the body portion 21, and the top chamfered portion 22.

Figure 2:
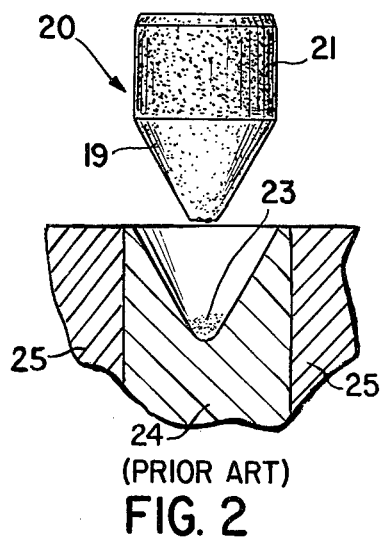
FIG. 2 is a cross-sectional view of a conventional press during the ejection cycle of the manufacture of a long-nose chisel compact according to a prior art process.

Referring to FIGS. 2, it has been found that conventionally-pressed, chisel compacts made according to the prior art process has resulted in non-uniformity of the sintered particles throughout the resulting compact. More particularly, it has been found when employing a conventional press process, whereas the body portion 21 is of a relatively hard, high-density structure, the tapered nose portion 19 is soft, with the particles being of low density, and thus the nose portion is structurally weak, thereby making it unsuitable for use in high efficiency drilling operations. As shown in FIG. 2, a lower punch 24 in conventional press is guided by die 25 and during the conventional press operation, particles 23 intended to form a portion of the nose portion 19 remain in the bottom of the punch 24, thereby resulting in a defective chisel compact 20.

Figure 3:
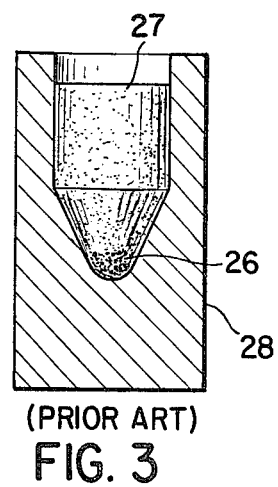
FIG. 3 is a cross-sectional view of a conventional centrifugal chisel compaction made according to a prior art process.

Likewise, referring to FIG. 3, in a conventional centrifugal forming process utilizing a centrifugal support 28, it has been found that the density of the particles 26 in the nose portion of the compact is greater than the density of the particles 27 forming the body portion of the compact, thereby resulting in non-uniform structural integrity of the chisel compact.

Figure 4:
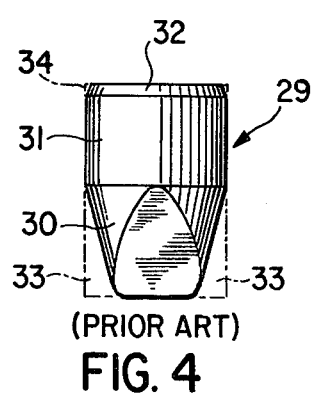
FIG. 4 is an elevational view of a presintered ingot made by a soft forming process of the prior art.

In another prior art process for making a compact, as illustrated in FIG. 4, a presintered ingot 29 is machined to form a cone shaped nose portion 30 and a body portion 31, as well as a top chamfered portion 32. During the machining operation, the material of the ingot, designated by the numerals 33 and 34, must be removed for forming the compact. Accordingly, the machining operation involves a waste of material, an increase in scrap rates, and low productivity.

Figure 5:
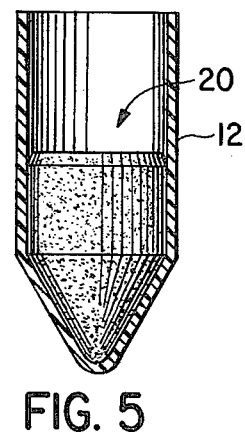
FIG. 5 illustrates the use of a non-resilient polymeric mold at the time of removal of the chisel compact from the metal mold according to the process of the subject invention.

Referring to FIG. 5, in the process of the subject invention, the compact 20 is disposed within a non-resilient polymeric mold 12, and is of uniform density throughout the nose portion and body portion thereof. As the assembly of the compact 20 and the non-resilient polymeric mold 12 are removed from the swing bucket and metal mold support, as described in greater detail hereinafter, the non-resilient polymeric mold 12 holds the nose portion and body portion together thereby preventing the compact from fracturing along the juncture between the nose portion and the body portion prior to the step of heating and sintering the assembly.

Figure 6:
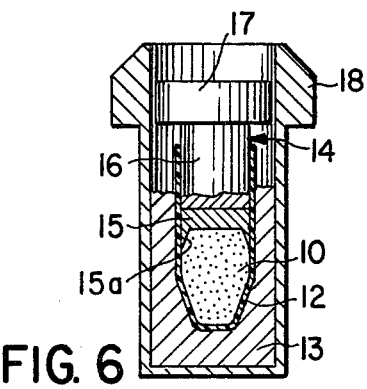
FIG. 6 is a sectional view of an apparatus to carry out the present invention comprising a centrifugal swing bucket in which there is positioned a cup mold, metal mold support, powder charge, and plunger.
Figure 7:
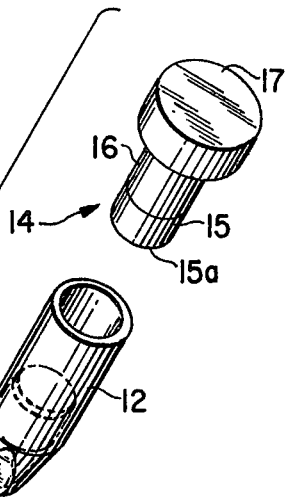
FIG. 7 is an exploded perspective view of the swing bucket, mold support, cup mold, and plunger shown in FIG. 6.

Referring to FIGS. 6 and 7, polymeric plastic cup mold 12 in which the inside surface conforms to the desired outside surface of the finished article is prepared. Cup mold 12 has an orifice which leads to a passageway of substantially uniform cross-sectional area. Preferably, cup mold 12 is a thin wall cup having good surface lubricity and of sufficient thickness for structural integrity, such as, for example, of a wall thickness of approximately 0.64 mm. In use cup mold 12 is filled with a weighed quantity of powder particles 10. Particles 10 may be of any material which is to be subjected to a subsequent sintering step. Metal carbide compact may be formed from metal carbide powder to which has been added the powder of cobalt or a similar cementing metal.

Cup mold 12 with its powder charge 10 is placed in a metal mold support 13 formed of a material such as aluminum alloy. Plunger 14 having punch face 15 composed of a material such as tungsten carbide, shank portion 16 composed of a metal of high specific gravity and guide portion 17 also composed of a metal of high specific gravity is inserted through the orifice of the cup mold 12. It is extremely important that punch face 15 of the plunger 14 has a snug fit in cup mold 12; and guide portion 17 has a snug fit in swing bucket 18. It is also desirable that punch face 15 have its outer edge formed with a circular embossment 15a which will imprint a chamfer in the surface of powder charge 10 with which it makes contact.

The assembly consisting of the powder charge 10, cup mold 12, metal mold support 13, and plunger 14 is positioned in centrifugal swing bucket 18. Bucket 18 is then mounted in a centrifuge which is a standard piece of equipment available on the market and, therefore will not be described herein. Typical treatment in a centrifuge in which the radius is 10 to 13 centimeters is 9000 rpm for approximately one minute, or five minutes from on to off with the switch operated automatically. This produces uniform compaction of the powder charge 10. Upon removal of bucket 18 from the centrifuge there is no tendency for the compacted powder to spring back as seen in the conventional press compaction.

Figure 8:
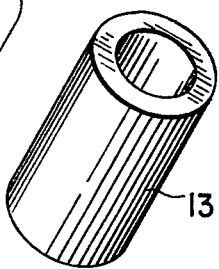
FIG. 8 is a view of a final sintered article made by the process of the invention.
Figure 8:
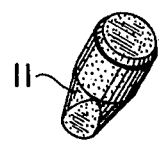

After compaction of powder charge 10 into cup mold 12, the cup mold with its compacted powder charge is removed from metal mold support 13 and plunger 14 is withdrawn. The cup mold and contained compacted powder is first subjected to a pre-sintering step at an elevated temperature of about 500°–600° C. This temperature is sufficient to vaporize the mold material and to produce an article of the general shape shown in FIG. 8, ready for the sintering step. The sintering step is carried out at an elevated temperature. In the case of tungsten carbides this temperature is about 1450°–1500° C. This temperature varies depending on the cementing material and alloy composition. After densification has been achieved finished article 11 (FIG. 8) is slowly cooled to room temperature.

While the invention has been described with reference to centrifugal compaction, there are times when a combination of conventional pressing followed by centrifugal compaction will produce an improved product. For instance, it is difficult to crush hard granules at the base of powder charge 10 (FIG. 6) using centrifugal compaction only. However, these hard granules may be crushed by frictional force in a conventional press operation. The charge may then be subjected to centrifugal compaction to produce an improved final product.

The effect of the various processing steps on powder charge 10 will be appreciated from the following dimensions of the charge, the pre-sintered form and the sintered dome compact after successive treatments:

| | |
|---|---|
| Height as loaded | 3.88 centimeters |
| Height as hand pressed | 2.72 centimeters |
| Height after centrifugal compaction | 2.41 centimeters |
| Height after presintering at 550° C. | 2.39 centimeters |
| Height after sintering at 1450° C. | 1.94 centimeters |

In all cases the density of the final product was the same as, or greater than, the density of the same product made by compaction in a press. However, centrifugal compaction provides substantially the same pressure to all parts of the powder whereas the conventional press produces a range of pressures throughout the powder.

The ability of plunger 14 to apply not only compaction pressure but also a chamfered or other surface to finished article 11 is wholly unexpected. Such a chamfered surface cannot be produced by a conventional press process. In a conventional press process it is necessary to employ a soft-forming operation to form a chamfer. Thus, the centrifugal compaction process as practice in the present invention eliminates the soft forming operation at the cone as well as the base chamfer.

While the invention has been described with reference to certain specific embodiments it is obvious that there may be variations which properly fall within the scope of the invention. Accordingly, the invention should be limited in scope only as may be necessitated by the scope of the appended claims.

I claim:

1. A method of making shaped articles from sinterable powder which comprises:
    (a) introducing said powder into a cup mold composed of destructible organic polymeric material selected from the group consisting of nylon, cellulose acetate, poly(methyl methacrylate), polypropylene or polyethylene, with an inner surface configuration corresponding to the outer surface configuration desired in the shaped article, said cup mold being supported by a metal mold support,
    (b) positioning a metal plunger, having a shank contoured to have a snug fit in said cup mold so as to make contact with the powder,
    (c) subjecting the powder, the cup mold, the mold support, and the plunger to centrifugal force to compress the powder against the inner wall of said cup mold,
    (d) removing said polymeric mold with shaped compressed powder from said metal mold support,
    (e) heating said mold and compressed powder to vaporize said mold, and
    (f) further heating to sinter said shaped compressed powder.

2. The method of claim 1 wherein the organic polymeric material is polyethylene.

3. The method of claim 1 wherein the plunger has an enlarged head portion composed of heavy metal or alloy.

4. The method of claim 3 wherein the plunger has a face composed of cemented tungsten carbide.

5. The method of claim 4 wherein the face of the plunger is contoured to mold the surface of the powder with which it makes contact.

6. The method of claim 5 wherein the face of the plunger is contoured to chamfer the finished article.

7. The method of claim 1 wherein said cup mold is non-resilient.

* * * * *